United States Patent [19]

Friederich et al.

[11] 4,375,807
[45] Mar. 8, 1983

[54] SOLAR CELL AND METHOD FOR THE MANUFACTURE THEREOF

[75] Inventors: Alain Friederich; Mieczylaw Hildebrandt; Daniel Kaplan; Patrick Herbet, all of Paris, France

[73] Assignee: Thomson-CSF, Paris, France

[21] Appl. No.: 130,714

[22] Filed: Mar. 17, 1980

[30] Foreign Application Priority Data

Mar. 16, 1979 [FR] France ............... 79 06744
Aug. 21, 1979 [FR] France ............... 79 21087

[51] Int. Cl.³ .................................................. F24J 3/02
[52] U.S. Cl. ............................... 126/443; 126/446; 126/901; 428/432; 428/428
[58] Field of Search .............. 126/417, 443, 448, 446, 126/900, 901; 350/1.7; 428/428, 432, 471, 472

[56] References Cited

U.S. PATENT DOCUMENTS

| | | | |
|---|---|---|---|
| 3,176,678 | 4/1965 | Langley | 126/901 |
| 3,176,679 | 4/1965 | Langley | 126/901 |
| 3,227,153 | 1/1966 | Godel | 126/448 |
| 4,059,093 | 11/1977 | Knowles et al. | 126/443 |
| 4,066,815 | 1/1978 | Olink et al. | 428/432 |
| 4,124,019 | 11/1978 | Heffelfinger | 126/443 |
| 4,156,420 | 5/1979 | Gunderson | 126/443 |
| 4,231,353 | 11/1980 | Kanatani et al. | 126/443 |
| 4,233,957 | 11/1980 | Kenny | 126/448 |

FOREIGN PATENT DOCUMENTS 2398901 2/1979 France ............... 126/443

*Primary Examiner*—James C. Yeung
*Attorney, Agent, or Firm*—Oblon, Fisher, Spivak, McClelland & Maier

[57] ABSTRACT

A solar cell comprises a first sealed glass envelope on which is deposited a solar radiation-absorbing material and a second sealed envelope placed around the first envelope in such a way that a space is created between the two envelopes in which a very low pressure is established, whereby the solar energy-absorbing material according to the invention is formed by at least one layer of a glass - metal compound covered by a layer of the oxides of the said metal.

12 Claims, 15 Drawing Figures

SOLAR CELL AND METHOD FOR THE MANUFACTURE THEREOF

BACKGROUND OF THE INVENTION

The present invention relates to a solar cell and to a method for the manufacture thereof.

One way in which solar energy can be regenerated is to raise the temperature of a liquid mass. There are fundamentally two basic structures, namely a planar structure and a tubular structure. The planar cells generally are in the form of a box on the bottom of which circulates a liquid to be heated in coils covered with an absorbent material. The upper surface of the cell which is exposed to solar radiation, is provided with a transparent glass separated from the coils by a layer of air. These cells operate according to the greenhouse effect principle. They have an acceptable efficiency for a limited temperature increase. When this temperature rises, the efficiency drops to a significant extent which is partly due to the losses by thermal convection in the air between the upper glass and the coils. It is therefore desirable to produce a vacuum between the upper glass and the absorbent elements. The planar structure is not adapted to this requirement, so that tubular solar cells have been proposed.

The invention relates more particularly to such cells. It is possible to use the heat pipe principle for draining the collected solar energy and this can be constituted by an envelope divided into two parts, the first part which is exposed to solar radiation is covered with an absorbent material and placed under a vacuum and the second part is placed in contact with the element to be heated. The envelope contains a liquid which vapourizes in the first part, absorbing heat and condenses in the second part, thus giving off the heat which has previously been stored. The cell also has means for supplying the fluid in the liquid phase to the first part of the tube. The absorbent material is generally a metal oxide or an absorbent plastic material.

Many structures have been proposed in the prior art. According to one of these, the absorbent is formed by depositing a thin layer of an oxidized metal on the inner glass envelope. The thermal contact between the absorbent material and the heat pipe is of good quality. However, the metal and the glass have very different expansion coefficients and their mechanical behaviour is detrimentally effected. The coating can tend to become detached.

According to a second method, the heat pipe is made from metal. This leads to the problem of the glass-metal joint between the outer envelope and the inner envelope. This joint ensures the sealing between a medium atmospheric pressure and the space between the two envelopes in which a high vacuum has been formed.

Other solutions have been proposed and, whilst retaining the two inner and outer glass envelopes, it has been proposed to add supplementary metallic elements as the absorbent.

In all these solutions, the thermal contact is not optimum and essentially takes place by tangential contact in accordance with a generatrix of the internal envelope and optionally by reradiation.

For certain applications, it is preferred to use structures other than those described hereinbefore, which do not involve the heat pipe principle and more particularly a structure in which a liquid to be heated circulated in a metal pipe, which has bent back on itself like a hairpin or U arranged within the inner envelope. In this case, it is necessary to ensure a draining of the heat collected by the absorbent to the liquid circulating in the tube. In more general terms, it is necessary to obtain a homogeneous temperature within the inner envelope of the solar cell.

BRIEF SUMMARY OF THE INVENTION

To obviate the disadvantages referred to hereinbefore and improve the quality of the drainage of the collected solar energy, the invention proposes the use of a glass-metal compound providing a very high quality thermal contact, whilst retaining a good mechanical behaviour and on which can be deposited the solar absorbent. This glass-metal compound can also serve for the welding of metallic elements to the glass envelopes.

The invention therefore relates to a solar cell comprising a first sealed envelope associated with solar radiation-absorbing means constituted by a coating deposited on one of the faces of the first envelope and a second sealed envelope placed around the first envelope in such a way that a space is created between the two said envelopes, wherein the layer of material constituted by a glass-metal compound is deposited at least on the face of the first envelope supporting the coating, the said layer being a first layer of the said coating.

The invention also relates to a method for the manufacture of such a solar cell.

BRIEF DESCRIPTION OF THE DRAWINGS

The invention is described in greater detail hereinafter relative to non-limitative embodiments and with reference to the attached drawings.

DETAILED DESCRIPTION OF THE PREFERRED EMBODIMENTS

Figure 1:
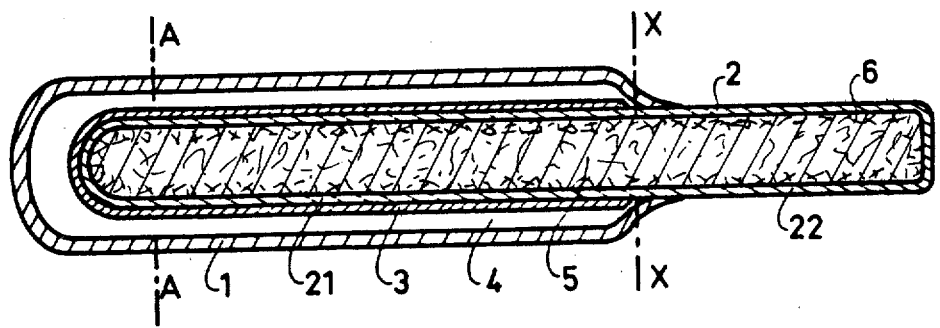
FIG. 1 is a longitudinal section of a solar cell according to a first embodiment in which the invention can be utilized.

In the following description, the same components or elements are given the same reference numerals throughout and will only be described once.

FIG. 1 illustrates a solar cell construction common to the prior art, but usable within the scope of the invention. FIG. 1 shows a sealed transparent glass envelope 2 having, for example, a cylindrical shape and comprising two portions 21, 22, whose separation is illustrated by an axis XX.

Figure 2:
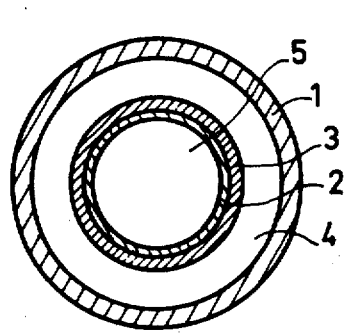
FIG. 2 is a cross-section of the cell of FIG. 1.

The first part 21 of the envelope 2 is called the evaporator and is placed under vacuum in a second envelope 1 and is exposed to solar radiation. It is shown in cross-section along the axis AA of FIG. 2. The envelope 1 is preferably constituted by a transparent material, e.g. glass.

The vacuum is formed within 5 the envelope 1 by any appropriate known means. In practice, the pressure in this envelope is approximately $10^{-5}$ Pascal. This pressure is maintained by means of devices known in the electron tube art under the name getters and which have the function of absorbing molecules present in envelope 1 and produced for example by means of an alkali metal. Envelope 1 is welded to envelope 2 by intimate fusion of the glasses of envelope 1 and 2 or by sealing by means of a glass-glass glue or any other material used in the vacuum art. Thus, a space 4 is created in which the vacuum is formed.

Envelope 2 in its portion 21 called an evaporator, is covered by an absorbent layer 3 formed by a material having a low emission coefficient ($\epsilon$) and a high absorption coefficient ($\alpha$), so that the ratio ($\alpha/\epsilon$) is as high as possible. The quality coefficient of the absorbent is defined in this way.

Envelope 2 contains a liquid which impregnates a capillary system 6 in the form of a "glove finger" placed against the inner wall of the envelope constituted, for example, by a fabric or wires made from natural or synthetic fibers.

The selected liquid must have a high latent evaporation heat in order to store a large amount of heat. Suitable liquids are, for example, water, glycol, alcohol, ammonia or a mixture thereof.

The cell functions as follows: the incident solar flux collected by the cell is zone 21 evaporates the liquid and the thus produced steam moves towards the cold point which is in the zone 22 or condenser where it condenses, whilst losing heat which is supplied to the medium to be heated. The condensed liquid then returns to portion 21 or the evaporator as a result of capillary system 6. Zone 22 is generally in contact by its outer face with a liquid to which is transferred the collected solar energy. A plurality of solar cells as described in FIG. 1 can be assembled within a single frame to increase this action.

The construction of the solar cell of FIG. 1 is described in greater detail in French patent application 76 13 002, filed on April 30th 1976 and published under No. 2,349,802.

Other prior art cells have a construction like that of FIG. 1. In all these cells the absorbent is constituted by a metal deposited on an internal envelope. The metal coating has an expansion coefficient which differs from that of the glass of the internal envelope. As the internal envelope and coating are subject to high thermal stresses it follows that the metallic behaviour of this coating is not very satisfactory.

Figure 3:
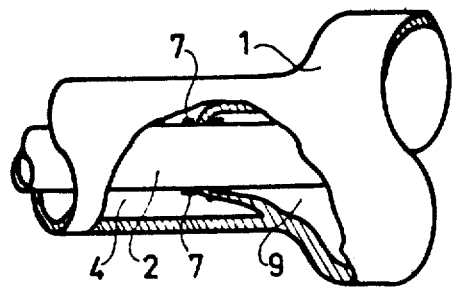
FIGS. 3 and 4 are examples of prior art cells.
Figure 4:
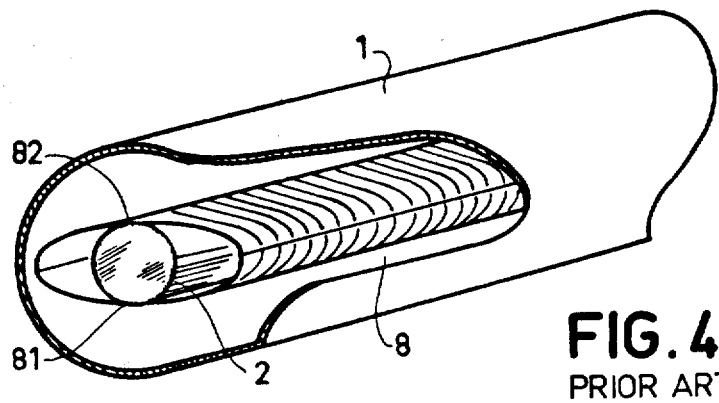

FIGS. 3 and 4 illustrate two further prior art constructions. In FIG. 3, the inner envelope is made from metal. The junction between the outer envelope 1 and the inner envelope 2 is by means of a metal-glass seal 7, which must ensure the sealing between compartment 4 and compartment 9. Compartment 9 is at atmospheric pressure and it follows that the pressure difference between the two compartments 4 and 9 is of the order of $10^5$ Pascal, which leads to serious constructional difficulties.

In FIG. 4, the absorbent is formed by two sheets of oxidized copper 8, whilst the inner envelope 2 and outer envelope 1 are made from glass. It is apparent that thermal contact is essentially ensured along two generating lines 82 and 81, so that said construction is not optimum.

Whilst retaining the advantages of the construction of FIG. 1 of a good thermal contact between the absorbent and the inner envelope and its realisation facilitated by methods known from the vacuum tube manufacturing art, the invention obviates the disadvantages of the prior art. The absorbent according to the invention is formed by a material based on a glass-metal compound in which the percentages vary, i.e. a mixture like the ceramic-metal compounds called cermets. The glass can be of the same type as that used for the inner envelope. The presence of glass eliminates any adhesion problems. Moreover, the metal forming the second element of the glass-metal compound ensures on the one hand a good thermal conductivity and on the other permits a direct oxidation or welding to the said metal or even a deposition of metal on the glass-metal compound by electrolysis.

The glass-metal compound can be deposited by the silk-screen process or by painting onto the inner envelope serving as a heat pipe. This compound is then heated to high temperature to form "a glass eutectic of the glass-metal compound of the envelope." This gives a coating with a high thermal conductivity.

The efficiency of the absorption after oxidation is dependent on the metal/glass ratio. The ratio ($\alpha/\epsilon$) defining the quality coefficient of the absorbent, as well as the absorption coefficiency $\alpha$ are dependent on the grain size distribution of the glass-metal compound. ($\alpha/\epsilon$) and $\alpha$ intersect for increasing the small grains. However, it should be noted that the adhesion quality of the compound to the glass support increases in an inverse ratio. On the basis of these findings, the invention proposes a number of variants.

Figure 5:
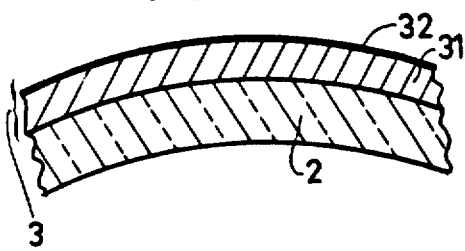
FIGS. 5 and 6 partial cross-sectional views of two variants of a first embodiment.

FIG. 5 is a first variant in which the absorbent layer 3 is formed by a layer of glass-metal compound 31 deposited on the glass support 2 and a layer of the oxide of the metal contained in the compound. This oxide is obtained by direct oxidation of the metal of the glass-metal compound. This structure is particularly suitable for fine grain.

Figure 6:
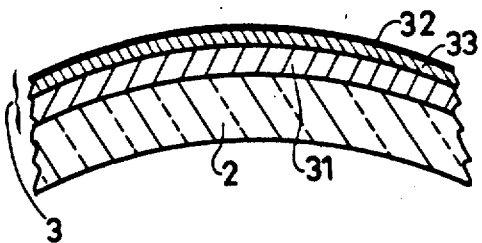

FIG. 6 is a second variant according to the invention in which the absorbent material is formed by three successive layers, namely a layer of the glass-metal compound 31, a metallic layer 33 and a metal oxide layer 32. The metallic layer 33 is obtained by electrolysis of the compound 31, followed by an oxidation forming layer 32. This structure is particularly suitable for the coarse grain compound. The quality of the absorbent is improved in two ways. On the one hand, the composite metal oxide 32/metal 33 layer has a good absorption coefficient and on the other hand the surface obtained by electrolysis has a rough appearance of the dendritic surface time which improves the coefficient $\alpha$. The adhesion of the metallic layer does not take place directly to the glass of the heat pipe as in the prior art and is instead to the glass-metal compound. This obviates the disadvantages of the prior art.

It is possible to combine the advantages of the structures of FIG. 5, i.e. a good adhesion and 6, i.e. a better absorption. To do this, the glass-metal compound is made heterogenic in a direction normal to the surface of heat pipe 2. After deposition the metal-glass ratio is varied by hot centrifuging in such a way that this ratio varies so that the surface concentration of metal increases. The deep layer of compound retains its good adhesion, whilst the surface layer becomes richer in metal.

Figure 7:
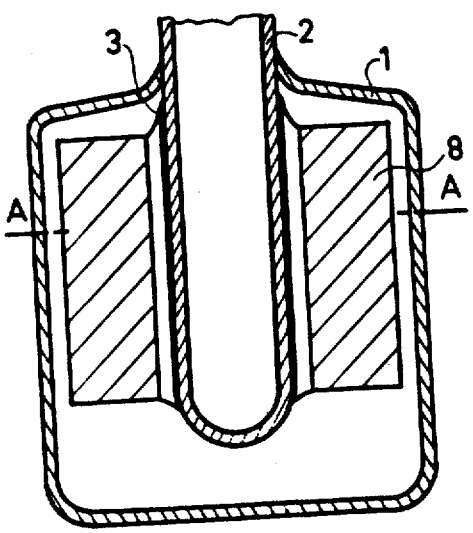
FIGS. 7 to 10 relate to two constructional embodiments of cells according to the invention.
Figure 8:
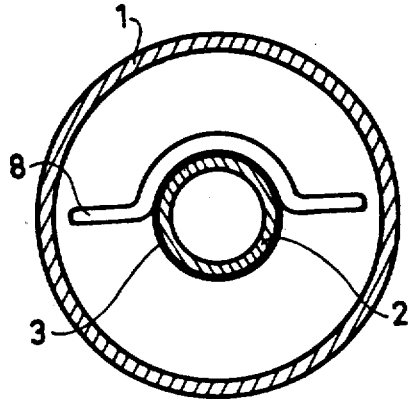

The absorption surface can be further improved by welding metal fins to the adsorbent. The glass-metal compound and the metal of said fins are then oxidized. FIG. 7 to 10 describe two examples of such a construction. In FIG. 7, a fin 8, for example made from copper and adapting to the shape of heat pipe 2 is welded to the absorbent 3. FIG. 8 is a cross-sectional view in accordance with the axis AA of FIG. 7.

Figure 9:
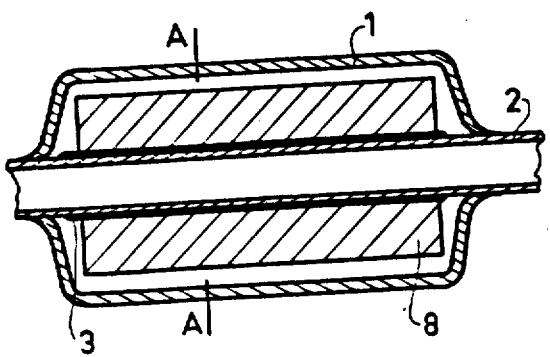
Figure 10:
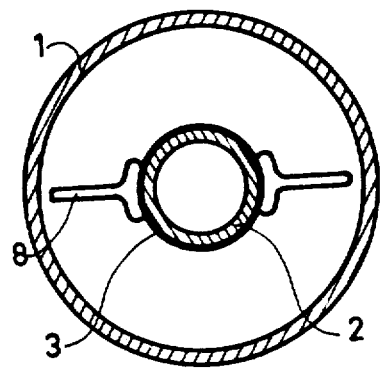

The solar cell of FIG. 9 has, for example, two fins 8 positioned on either side of the heat pipe and welded directly to the absorbent 3. For the purposes of illustration, a heat pipe structure traversing the space 1 on either side is described. FIG. 10 is a cross-sectional view along the axis AA of FIG. 9. Other configurations are possible without going beyond the scope of the invention.

An interesting example for the metal used is copper. Copper oxide CuO is an excellent solar absorbent. In the case of a 1 μm thick layer an absorption coefficient α of 90 to 95% of the solar spectrum is obtained. If this oxide layer could be generated by the oxidation of a solid copper plate quality factor (α/ε) of approximately 20 would be obtained at an absorbent temperature of approximately 150° C.

In the case of the structure of FIG. 5 it would be possible to come close to this ratio, but α decreases in proportion to the density of the glass-metal compound. In the case of the structure of FIG. 6, the ideal case of "oxidation on solid copper" is approached. Furthermore, as indicated hereinbefore the coefficient α is improved by the rough appearance given to the metallic surface by electrolysis.

The efficiency of a solar cell according to the invention reaches 80%.

Hereinafter, the methods for the manufacture of the solar cell will be described in detailed manner and in particular the method for obtaining the absorbent and its application to the inner envelope.

The basic material constituting the absorbent is obtained by mixing very fine copper powder (or copper oxide reduced to power form) with glass powder. The copper grains must have a maximum size of a few hundredths of a micron. The glass grains have a size of approximately a few hundredths to a few microns. The mixture is in a ratio of 70 to 95% for the metal and 30 to 5% for the glass. The glass is chosen from those having a softening point between 550° and 700° C. The temperature reaches by the solar cell when operating remains below these values and is approximately 350° C. The thus obtained mixture is suspended in an organic binder, which can for example by latex dissolved in dichloroethane.

The mixture is then applied to the inner glass envelope of heat pipe. It can be applied by means of a spray gun, a brush or by wetting (using the capillarity effect). If it is then desired to obtain a heterogenic structure of the glass-metal compounds, this stage is followed by a centrifuging stage. The upper layer of the mixture will become richer in metal. The binder must then be eliminated, which is carried out by firing in the open air at a temperature of 300° to 500° C. This firing brings about the oxidation of the metal and must be followed by a heat treatment in a reducing atmosphere, for example in hydrogen. The temperature is increased up to the softening point of the glass contained in the absorbent as well as that of the glass of the envelope. These two glasses are preferably of the same type and when an adequate temperature is reached a eutectic is formed, thus ensuring a perfect adhesion of the glass-metal mixture to the heat pipe. The thickness of the thus formed layer must be approximately 100 μm to 1 mm.

In order to obtain the structure of FIG. 6 it is possible at this stage to deposit a supplementary layer on the metal by electrolysis and/or optionally carry out the welding of the metal fins (FIGS. 7 to 10).

The final stage consists of oxidizing either the surface layer of the glass-metal compound (FIG. 5), or the metal layer deposited by electrolysis (FIG. 6). The optionally provided metal fins (FIGS. 7 to 10) are also oxidized and for this purpose the heat pipe covered by the glass-metal compound is immersed in an oxidizing bath.

The inner and outer glass envelopes are obtained by conventional methods used in the vacuum tube industry. This also applies regarding the glass-glass seal at the junction of the two envelopes. These processes are well known to the Expert.

Figure 11:
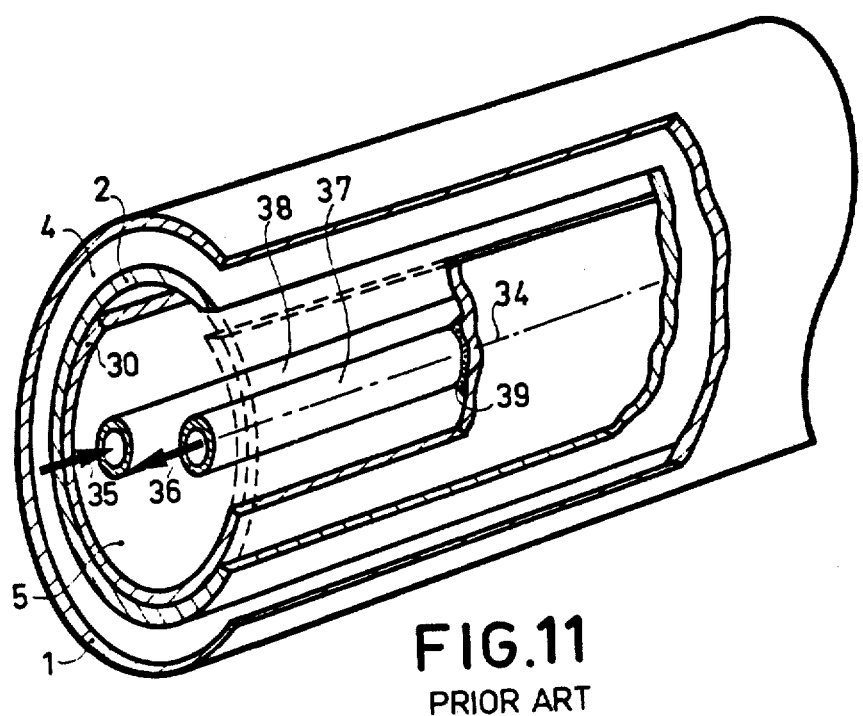
FIG. 11 a further prior art solar cell.

For certain applications, other structures and in particular that illustrated in FIG. 11 are preferred. The solar cell, as hereinbefore, comprises an outer glass envelope 1 and an inner envelope 2, which is also made from glass 8, between which a vacuum of approximately $10^5$ Pascal is produced. However, a liquid to be heated circulates in a hairpin or U-shaped metal pipe having two branches 37, 38 placed within the envelope 1 and in that part of the envelope which is subject to solar radiation, i.e. that corresponding to part 21 of the cell of FIG. 1. In FIG. 11, the circulation of liquid is indicated by the arrows 35 and 36 and can be formed by water. According to this construction, the means which absorb the solar energy are constituted by a thin layer of copper 30, which is slightly elastic and is placed within envelope 2 in contact with the inner wall thereof. The pipe in which the fluid to be heated circulates, i.e. the heat-transfer fluid, is secured by a weld 39 in accordance with a generatrix 34. Heat drainage is not optimum, largely due to the non-homogeneous thermal contact between the copper layer 30 and wall 2.

The invention can also be used with advantage in this construction and as a result of supplementary arrangements which will be described hereinafter makes it possible to improve the drainage of the collected solar energy and ensure a homogeneous temperature within envelope 2, whilst retaining the advantages described hereinbefore.

A construction utilizing the invention is described with reference to FIGS. 12 to 14. The cell illustrated in FIG. 12 retains the general construction of that of FIG. 11.

As hereinbefore, the solar energy absorbing means are constituted by a layer of the glass-metal compound and at least one layer of the oxide of said metal, the assembly being designated by the reference numeral 3. Moreover, a layer of the glass-metal compound 30' is also deposited on the inner wall of envelope 2. Due to the high thermal conductivity, the glass-metal compound according to the main patent application having a metal percentage between 70 and 95%, layer 30' makes the temperature homogeneous within the envelope 2 and also permits a direct welding of one of the branches of the hairpin-shaped pipe 37 to layer 30'. Thus, the drainage of the solar energy collected by the absorbent means is carried out under very good conditions. The thickness of layer 30' is in the range of 100 μm to 1 mm.

Figure 12:
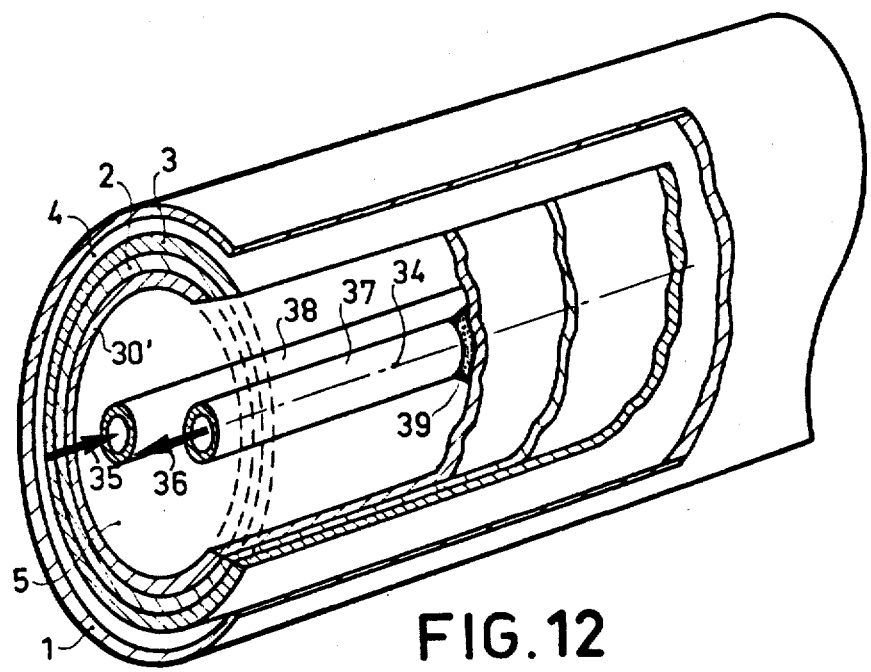
FIGS. 12 to 14 the adaptation of the invention to such a solar cell.
Figure 13:
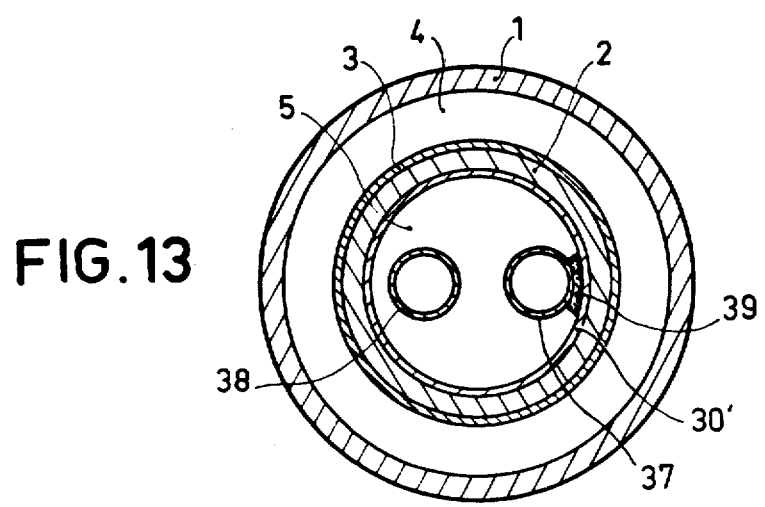
Figure 14:
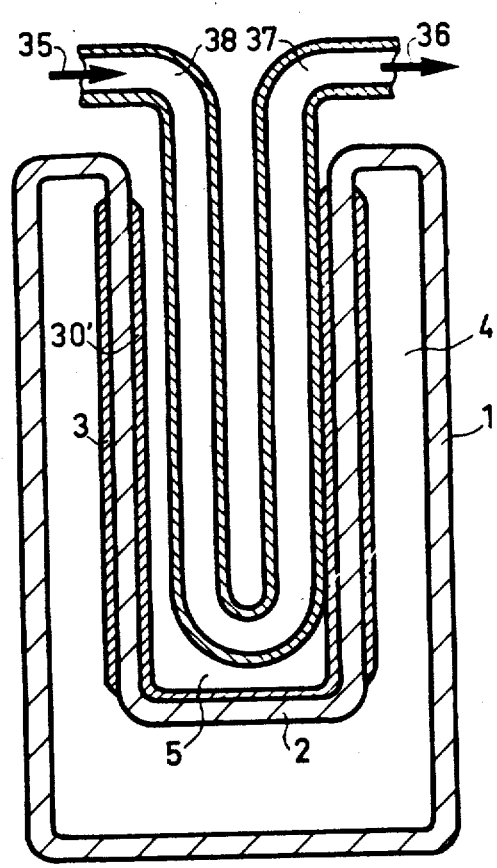

FIG. 13 is a cross-section and FIG. 14 a longitudinal section of the cell of FIG. 12.

The method for the manufacture of the solar cell includes all the stages used in the manufacturing method described hereinbefore, which will not be described again. There are also two supplementary stages, namely the deposition on the inner wall of envelope 2 of a layer of the glass-metal compound and the operation consisting of welding the U-shaped pipe with two branches 37, 38 to the said deposit. The deposit of the glass-metal layer 30' is performed simultaneously with the deposition of the supporting layer of the solar energy absorbent on the outer face of the envelope 2. Metal pipe 37, 38 is welded prior to the oxidation stage. This can be carried out by depositing a welding agent within the inner envelope and maintaining the U-shaped pipe in contact with the wall of layer 30' heat until melting takes place.

Figure 15:
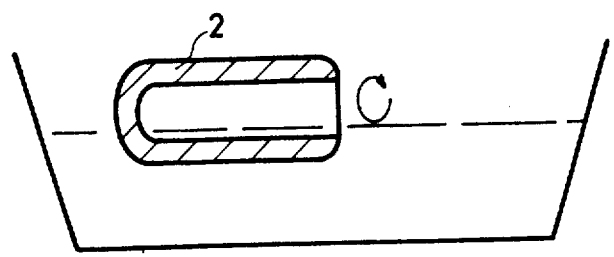
FIG. 15 one of the stages in the manufacturing process for such a cell.

More specifically wetting (use of the capillarity effect) can be used for depositing the glass-metal compound on the inner wall of envelope 2. This stage is diagrammatically illustrated in FIG. 15.

The embodiment described hereinbefore is not limited to the construction illustrated in FIGS. 12 to 14 and in particular to the shape of the hairpin-like heat-transfer pipe, the latter can be given any appropriate shape and in non-limitative manner can be in the form of a coil placed in envelope 2. Finally, the solar energy absorbing means symbolized by the coating 3 can be realised in accordance with any of the variants described hereinbefore. The same applies regarding the fin welded to the metallic layer or the glass-metal compound.

Moreover, it is also possible to use metals other than copper for making the absorbent according to the invention and in particular it is possible to use chromium and chromium oxides: CrO, $Cr_2O_3$ or manganese and manganese oxide: MnO. It is also possible to use an alloy of these metals.

If the reflectivity in the infrared range of the absorbent support is below 90% it is possible to improve the performance of the solar cell by depositing on the inner face of the outer envelope a semi-reflecting indium oxide layer ($In_2O_3$) which is deposited on the tin. This layer permits the passage of the solar spectrum and reflects infrared. Its thickness can be approximately 7000 Å to 0.01 mm.

Finally, it is possible to improve the efficiency of the cell by providing reflecting mirrors either within the cell, i.e. between the first and second envelopes or outside the same. The shape of these mirrors is determined in such a way that the reflected rays are concentrated on the absorbent. These arrangements are well known to the Expert and do not fall within the scope of the invention.

What is claimed is:

1. A solar cell having a first envelope and a second sealed envelope placed around said first envelope in such a way that a space is created between two envelopes and a solar radiation-absorbing means having a coating deposited on one of said faces of said envelope wherein said coating comprises a first layer constituted by a glass-metal compound consisting of fine metal powder mixed with glass powder which is deposited at least on the face of said first envelope supporting said coating; and a second layer consisting only of a metal oxide which absorbs solar energy.

2. A cell according to claim 1, wherein the coating also comprises a third layer constituted by metal deposited by electrolysis on the first layer.

3. A cell according to claim 1, wherein the glass-metal compound is homogeneous at all points of the said first layer.

4. A cell according to claim 1, wherein the concentration of metal in the surface portion of said first layer is greater than in the remaining portions of said first layer.

5. A cell according to claim 1, wherein the first and second envelopes are made from glass of the same type as the glass used in the glass-metal compounds.

6. A cell according to claim 1, wherein fins are welded to said coating.

7. A cell according to claim 6, wherein said fins are constituted by a layer of the same metal as the glass-metal compound, the planes formed by each of the said metal layers being perpendicular to the surface of said first envelope.

8. A cell according to claim 1, wherein the inner face of the second envelope is also covered with a semi-reflecting material deposit, said material being tin-doped indium oxide $In_2O_3$.

9. A cell according to claim 1, wherein said coating is deposited on the outer face of said first envelope and a layer of said glass-metal compound is also deposited on the inner face of the said envelope.

10. A cell according to claim 9, wherein a metal pipe in which circulates a fluid for heating by solar radiation is placed within the first envelope and wherein the outer wall of at least part of the said pipe is welded to the glass-metal compound layer deposited on the inner face of the first envelope.

11. A cell according to claim 10, wherein within the first envelope the said pipe is shaped like an elongated U and as its section is circular the pipe is welded to the glass-metal compound layer along one generatrix of one of the branches of the said U.

12. A cell according to claims 1 or 9, wherein the glass-metal compound layers have a thickness between 100 μm and 1 mm.

* * * * *